(12) United States Patent
Castano et al.

(10) Patent No.: US 7,676,685 B2
(45) Date of Patent: Mar. 9, 2010

(54) METHOD FOR IMPROVING THE DATA TRANSFER IN SEMI SYNCHRONOUS CLOCK DOMAINS INTEGRATED CIRCUITS AT ANY POSSIBLE M/N CLOCK RATIO

(75) Inventors: Marco Castano, Capo d'Orlando (IT); Salvatore Pisasale, Catania (IT); Carmine Ciofi, Messina (IT); Francesco Giotta, Putignano (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 869 days.

(21) Appl. No.: 11/421,306

(22) Filed: May 31, 2006

(65) Prior Publication Data
US 2006/0271806 A1 Nov. 30, 2006

(30) Foreign Application Priority Data
May 31, 2005 (EP) .................................. 05011697

(51) Int. Cl.
*G06F 1/12* (2006.01)
(52) U.S. Cl. ....................................... 713/600; 710/80
(58) Field of Classification Search ................. 713/600; 710/60
See application file for complete search history.

(56) References Cited
U.S. PATENT DOCUMENTS

| | | | | |
|---|---|---|---|---|
| 5,634,041 A | * | 5/1997 | Pratt et al. ................. | 713/375 |
| 5,754,833 A | | 5/1998 | Singh et al. ................. | 395/551 |
| 5,909,563 A | | 6/1999 | Jacobs ........................ | 395/309 |
| 7,036,038 B2 | * | 4/2006 | Urzi et al. .................... | 713/401 |
| 2002/0196886 A1 | | 12/2002 | Adkisson ..................... | 375/362 |
| 2004/0223564 A1 | | 11/2004 | Adkisson ..................... | 375/354 |
| 2004/0225910 A1 | | 11/2004 | Adkisson ..................... | 713/400 |
| 2004/0236979 A1 | | 11/2004 | Wilcox et al. ............... | 713/500 |

FOREIGN PATENT DOCUMENTS

| | | |
|---|---|---|
| EP | 1347355 | 9/2003 |
| WO | 99/19785 | 4/1999 |

* cited by examiner

*Primary Examiner*—Albert Wang
(74) *Attorney, Agent, or Firm*—Lisa K. Jorgenson; Allen, Dyer, Doppelt, Milbrath & Gilchrist, P.A.

(57) ABSTRACT

A method for data transfer between two semi-synchronous clock domains in a System on Chip (SoC) includes first and second integrated processors or circuits respectively operating at first and second clock frequencies. The SoC includes a phase for detecting, for each frequency ratio between the first and second clock frequencies, a maximum rate of the data transfer, with the rate being a function of all the possible input and output delays supported by the SoC. This is dependent on the parameters of the SoC. There is also a phase for programming a generic frequency converter between the first and second integrated processors for the data transfer, and a phase for scheduling the data transfer between the semi-synchronous clock domains.

21 Claims, 12 Drawing Sheets

| Cycle $i$ | 0 | 1 | 2 |
|---|---|---|---|
| SUTV_S | 0 | 1 | 0 |
| SUTV_F | 0 | 1 | 0 |
| SIR | 0 | 1 | 1 |

FIG. 12

```
set_parameter_attribute global_sig_gen MinValue -2147483648
set_parameter_attribute global_sig_gen MaxValue -2147483647
set_parameter_attribute global_sig_gen EnumValues (0 1 2)
set_parameter_attribute global_sig_gen SymbolicNames {{instantiation of both signal generators}
{instantiation of down ctrl signal generator} {instantiation of up ctrl signal generator}}
set_parameter_attribute global_sig_gen Label {Signal Generators}
set_parameter_attribute global_sig_gen Description {0: instantiation of both signal generators, 1:
instantiation of one ctrl signal generator}
autocomplete_activity DesignConfigurationIntent current_design- quiet ctrl_sig_gen
set_port_attribute suv_f {MinOutputDelay[clk_in]} {=percent_of_period {0}}
set_port_attribute suv_s {MinOutputDelay[clk_in]} {=percent_of_period {0}}
set_port_attribute sir   {MinOutputDelay[clk_in]} {=percent_of_period {0}}
set_port_attribute suv_f {MaxOutputDelay[clk_in]} {=percent_of_period {10}}
set_port_attribute suv_s {MaxOutputDelay[clk_in]} {=percent_of_period {10}}
set_port_attribute sir   {MaxOutputDelay[clk_in]} {=percent_of_period {10}}
set_port_attribute synch {MinOutputDelay[clk_in]} {=percent_of_period {0}}
set_port_attribute synch {MaxOutputDelay[clk_in]} {=percent_of_period {10}} current_design- quiet gfconv_down_ctrl
set_port_attribute req_f {MinInputDelay[clk_in]} {=percent_of_period {0}}
set_port_attribute ack_s {MinInputDelay[clk_in]} {=percent_of_period {0}}
```

FIG. 13

METHOD FOR IMPROVING THE DATA TRANSFER IN SEMI SYNCHRONOUS CLOCK DOMAINS INTEGRATED CIRCUITS AT ANY POSSIBLE M/N CLOCK RATIO

FIELD OF THE INVENTION

The present invention relates in general to a method for data transfer between semi-synchronous clock circuits, and more specifically, for synchronizing two semi-synchronous clock domains The present invention also relates to a data transfer system which comprises a generic frequency converter for data exchange between two integrated processors or circuits in a System on Chip (SoC) based on a synchronous interconnection protocol

BACKGROUND OF THE INVENTION

The complexity of System on Chip (SoC) designs is rising inexorably with a simultaneous increase in the number of integrated processors or circuits (IPs) operating with different clock frequency signals. Therefore, the SoC design strategy presents the problem of arranging an efficient interaction between separate processors or circuits to obtain the maximum possible data transfer rate with a low impact on the area.

In the literature, the problem of synchronizing two semi-synchronous integrated processors or circuits (IPs) in an SoC and its various approaches are widely documented. At least in principle, it is possible to design a specific method supporting a correct data exchange between two semi-synchronous clock integrated processors or circuits that work with respective frequencies having a well defined ratio m/n.

A few methods to synchronize semi-synchronous domains are known in the literature for specific frequency ratios, each of which exploits straightforward circuitry to address synchronization issues related to data exchange. However, these approaches are not susceptible for handling all possible frequency ratios m/n.

Moreover, these specific methods often require several signals that need to be generated by a clock generation subsystem to drive reliable transfers, further increasing post-layout simulation for chip validation.

In fact, these specific methods provide that the clock generator subsystem, for each synchronizer instantiated within the SoC, generates, routes and calibrates some control signals needed to store some information, for instance, regarding the frequency ratio and other characteristics of the clock signals which are necessary for a correct data exchange.

For these reasons, it is expensive, at least in terms of time and resources, to use such methods to synchronize semi-synchronous domains, not only because they do not manage in a flexible and general way all the frequency ratios (thus addressing the synchronization problem in a systematic and automatic way), but also because they require a device having a high impact on the clock generator subsystem and on the area of the SoC as a whole.

In the specific literature, a few methods exist that address the problem of providing a synchronization according to a systematic approach and without loading the clock generator subsystem. Such methods exploit conventional dual port RAM or other unconventional FIFO buffers (dual port based methods) where only two stage buffers are used, one of which is synchronous to the faster clock and the other to the slower clock.

Such methods are based on the specific relationship of the two involved clocks, driving the swap of data from the input buffer to the output one in order to synchronize data. Other similar methods exploit a double input buffer to reduce transfer latency and similarly swap the data to the output buffer, avoiding metastability issues However, methods that insure data synchronization by using a dual port RAM have the disadvantage of introducing large latencies that dramatically reduce the throughput of the system. A dual port RAM inevitably introduces some delay because of the need for the synchronization of the read and write ports that work at different frequencies.

This issue is partially addressed in a method based on a dual port RAM when a data stream is sent but an intrinsic delay remains when communication is bursty. In fact, one datum always needs at least two clock cycles to be transmitted.

Moreover, a method that uses a FIFO (with two or more stages) to buffer a wide data bus, as those generally present in an SoC, is inevitably much more area consuming. This may be a critical aspect that leads to limit as much as possible these approaches.

There is a need for synchronization method that is able to guarantee the maximum possible data transfer for each frequency ratio m/n, without introducing latencies for improper data-rate exchange, and with a low impact on the clock generator subsystem and on the area.

More particularly, there is also a need for managing only the bus communication control signals in a selective way while respecting the timing constraints imposed by the two involved integrated processors or circuits, by the wires buses, by the clocks frequencies and by the constraints of the technology implemented for the system

SUMMARY OF THE INVENTION

In view of the foregoing background, an object of the present invention is to provide a method and a corresponding system for improving data transfer in semi-synchronous clock domain circuits.

Another object of the present invention is to provide a method and a corresponding system for synchronizing two semi-synchronous clock domains according to a systematic approach without introducing latencies that dramatically reduce the throughput of the system, and without using buffering techniques for storing data not ready to be processed.

These and other objects, advantages and features in accordance with the present invention are provided by a method to know "a priori" a maximum possible data rate for a specific ratio m/n taking into account all the possible timing loss sources present in an interconnection line, thus providing a useful tool that stresses the constraints to achieve a desired data rate. The method may alert a designer about the actual possibility to synthesize devices or integrated circuits on the basis of specific project parameters in order, not only to foresee the performance, but also to verify the feasibility of the synthesization phase.

The method may synchronize two semi-synchronous clock domains for data transfer comprising the following phases: a) analysis, for each frequency ratio under test, to know a maximum possible data transfer rate as a function of all the possible input and output delays that may be tolerated, depending on critical technological parameters; b) providing a generic frequency converter between a couple of integrated processors or circuits for data exchange that may be programmed for each frequency ratio m/n; and c) configuring at least a scheduler for driving the data transfer.

More particularly, the method may operate at the faster clock frequency and acts only on the communication (bus)

control signals in such a way to schedule the transfer operation phases to allow a reliable exchange for each frequency ratio m/n (<1), with the maximum possible data transfer rate, and without the use of buffers.

To reach these objectives, few critical parameters are considered, which are strictly related to the silicon integration process and required for the device implementation. The method allows one to introduce specific constraints in each case under study to supply the design engineer with an easy way to customize their design, with a view to matching the particular requirements of the case under test in an straightforward and flexible way.

BRIEF DESCRIPTION OF THE DRAWINGS

The features and advantages of the method of the present invention will be apparent from the following description of an embodiment thereof given by way of non-limiting examples with reference to the attached drawings.

FIG. 12 shows a table representing an example of the preset values elaborated by the design tool according to the present invention.

FIG. 13 shows a fragment of the file script output of the design tool according to the present invention, which acts as an interface with a standard synthesis tool.

DETAILED DESCRIPTION OF THE PREFERRED EMBODIMENTS

Figure 1:
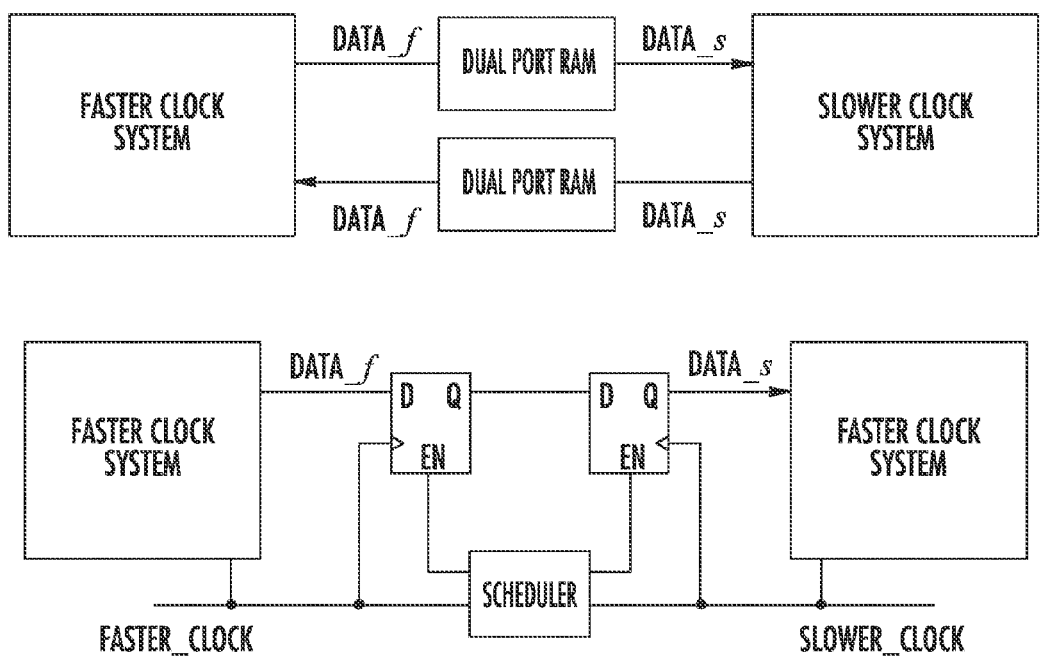
FIG. 1 shows a simplified and schematic representation of a prior art system for synchronizing semi-synchronous domains
Figure 2:
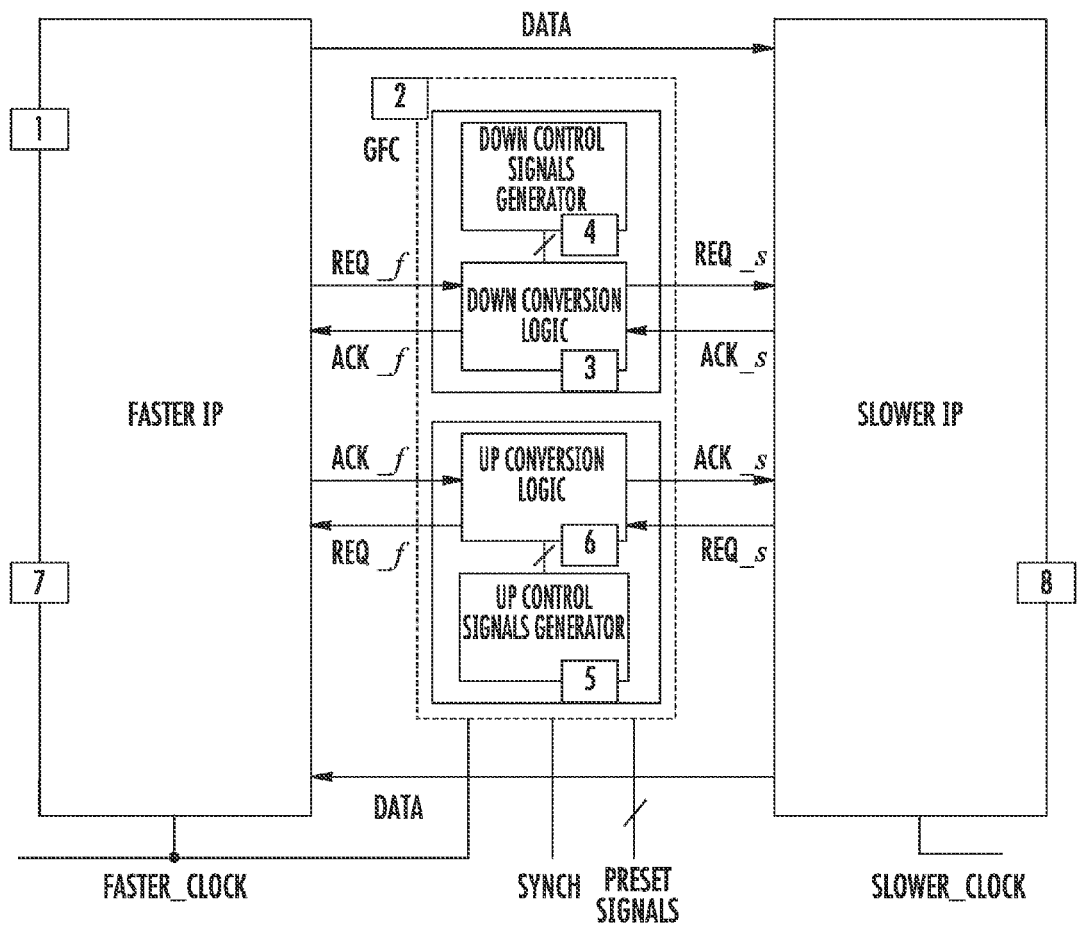
FIG. 2 shows a simplified and schematic representation for an architecture of a generic frequency converter of a data transfer system according to the present invention.

Referring now to the drawings, and specifically to the example of FIG. 2, a generic frequency converter 2 is inserted between a couple of processor or circuits for data exchange. For correctly understanding the principles and rules is which the generic frequency converter is based and implemented on, a few considerations about the data transfer rate are provided below.

A System on Chip (SoC) includes two integrated processors or circuits, hereafter referred as a Faster IP and a Slower IP. The processors or circuits respectively operate with a corresponding clock signal Faster_clock at a frequency $f_{faster}$ and Slower_clock at a frequency $f_{slower}$.

Let $R_F=m/n(\leq 1)$ be the clock frequencies ratio, and m and n are integers with no common integer divider but one. This frequency constraint assures a periodic relationship between the rising edges of the two clock signals. For brevity, this period will be referred to as a synchronization period $T_S$. Furthermore, for simplicity it is assumed that after each synchronization period $T_S$ the two clock signals are aligned.

Figure 3:
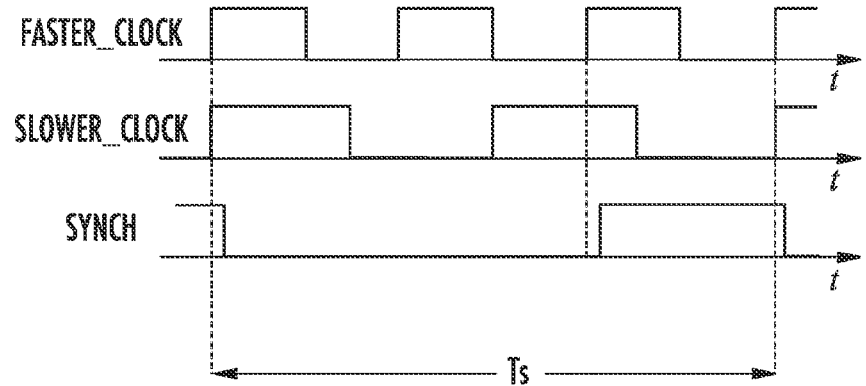
FIG. 3 shows the synchronization period $T_S$ and the timing of the synchronization signal according to the present invention when the two clocks have a frequency ratio of 2/3.

According to these assumptions, within the synchronization period $T_S$, n cycles of the Faster_clock and m cycles of Slower_clock occur, as schematically shown in FIG. 3 for m=2 and n=3. Within the synchronization period $T_S$, all the phase relationships that occur between the rising edges of the two clock signals are present, and they periodically repeat every synchronization period $T_S$.

To establish when the clock signals are aligned, a Synch signal is supposed high for a Faster_clock cycle (being in such a high logic level in a last cycle within the synchronization period $T_S$), as shown in FIG. 3. As a consequence, the frequency $f_S$ of the Sync signal is $$f_S = \frac{f_{faster}}{n} = \frac{f_{slower}}{m}.$$

Starting from this hypothesis, it is possible to mathematically demonstrate that we need to store in memory only three events for correct data transfer from one integrated processor or circuit to the other one.

Specifically, we must store in memory the event which indicates the Set Up Time violations for the signals forwarded by the faster integrated processor or circuit toward the slower one, the event which indicates the Set Up Time violations for the signals forwarded by the slower integrated processor or circuit toward the faster one, and finally the event which says when the slower integrated processor or circuit samples the data.

Thus, it is possible to demonstrate that these three events are just the only ones that we need to take into consideration for correctly transferring data.

Let $T_S=1/f_S=n/f_{faster}=m/f_{slower}$ be the synchronization period. To know the instant when the positive edges of the two clocks are within the synchronization period $T_S$, a time resolution $T_R$, which is the maximum common divider between the semi-periods of the clocks, is defined as:

$$T_R = \frac{T_S}{2mn}$$

More particularly, the time resolution $T_R$ is used to derive:

The Faster_Clock period $T_{faster}$, which is given by $T_{faster}=2mT_R$

The Slower_Clock period $T_{slower}$, which is given by $T_{slower}=2nT_R$

The $i^{th}$ rising edge of the Faster_Clock within the synchronization period $T_S$ occurs at $t_i^{rf}=2imT_R$ ($0 \leq i < n$); and The $j^{th}$ rising edge of the Slower_Clock within the synchronization period $T_S$ occurs at $t_j^{rs}=2jnT_R$ ($0 \leq j < m$).

To allow correct data communication, a Set Up Time of the system, $T_{SU}$, is defined as follows:

$$T_{SU}=p_f 2mT_R + p_s 2nT_R$$

In other words, the Set Up Time $T_{SU}$ is the time required for the bus control signals to propagate from the faster integrated processor or circuit to the slower one. The parameters $p_f$ and $p_s$ generally range in $[0, \infty)$ which establishes respectively how many Faster_clock and Slower_clock periods are required for signal propagation.

More generally, if the bus is full duplex, with the buses having different lengths and characteristics, two Set Up Times are defined. One for the command bus and one for the response bus.

Let us now assume that the Faster IP starts an action at time $t_i^{rf}$. The time instant $t_{ni}^{rs}$ at which the first rising edge of Slower_Clock occurs after $t_i^{rf}$ can be calculated as follows:

$$t_{ni}^{rs} = \left(\left\lfloor \frac{t_i^{rf}}{T_{slower}} \right\rfloor + 1\right) T_{slower} = \left(\left\lfloor \frac{mi}{n} \right\rfloor + 1\right) 2nT_R$$

where i is the index indicating the period of the Faster_clock within the synchronization period $T_S$. Therefore, a data transmission which begins at the time instant $t_i^{rf}$ would be safely completed at time $t_{ni}^{rs}$ only if:

$$\Delta t_i = t_{ni}^{rs} - t_i^{rf} < T_{SU} \quad (\text{Eq. 1})$$

Figure 4:
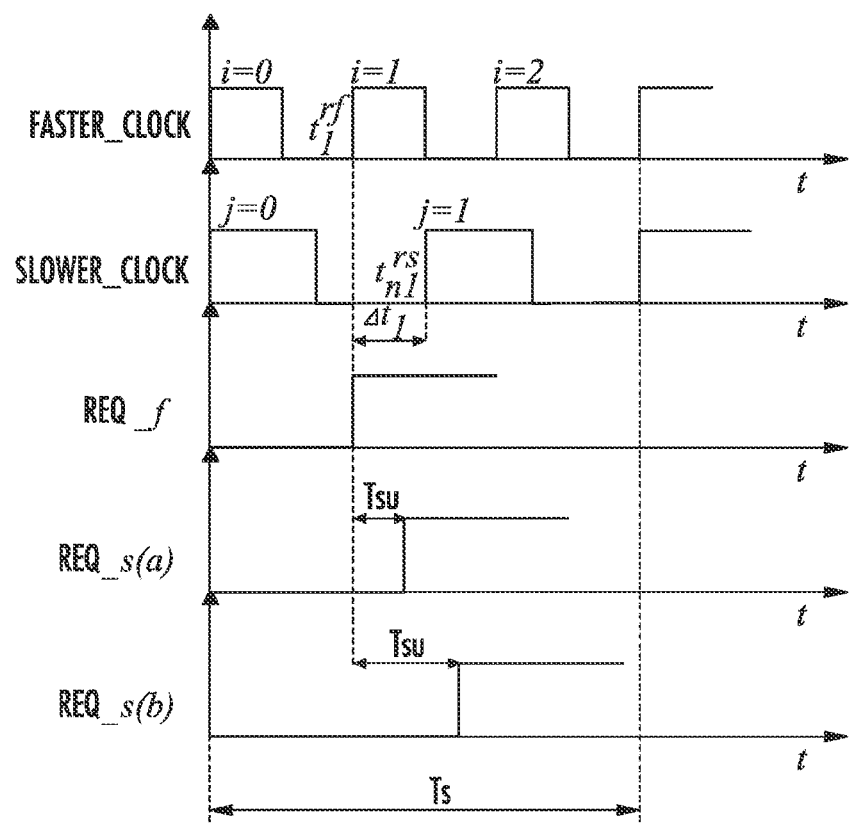
FIG. 4 shows, in a simplified and schematic representation, a Set Up Time of the system in two different cases, and the timing constraints that insure no Set Up Time violations for data which is sent by a faster integrated processor or circuit towards a slower one according to the present invention.

For each i within the synchronization period $T_S$, Eq. 1 states when a Set Up Time violation occurs for transfer operations generated by the Faster IP and beginning in that cycle, as depicted in FIG. 4. It is easy to verify that no Set Up Time violation occurs in the case (a) shown in FIG. 4, while for an action which starts in the same cycle (i=1) when a different Set Up Time $T_{SU}$ is defined for the system (case b) no correct data transfer is possible.

After easy calculations, Eq. 1 may be replaced by:

$$\left\lfloor \frac{mi}{n} \right\rfloor + 1 - \frac{mi}{n} < p_f \frac{m}{n} + p_s \quad (\text{Eq. 1'})$$

In the same way, let us assume that the Slower IP starts an action at time $t_j^{rs}$. The time instant $r_{nj}^{rf}$ at which the first rising edge of Faster_Clock occurs after $t_j^{rs}$ can be calculated as follows:

$$t_{nj}^{rf} = \left(\left\lfloor \frac{t_j^{rs}}{T_{faster}} \right\rfloor + 1\right) T_{faster} = \left(\left\lfloor \frac{nj}{m} \right\rfloor + 1\right) 2mT_R$$

where j is the index indicating the period of the Slower_clock within the synchronization period $T_s$. Therefore, a data transmission which begins at the time instant $t_j^{rs}$ would be safely completed at time $t_{nj}^{rf}$ only if:

$$\Delta t_j = t_{nj}^{rf} - t_j^{rs} < T_{SU} \quad (\text{Eq. 2})$$

For each j within the synchronization period $T_S$, $\Delta t_j$ states when a Set Up Time violation occurs for transfer operations generated by the Slower IP which begins in that cycle, Eq. 2 may be rearranged as follows:

$$\left\lfloor \frac{nj}{m} \right\rfloor + 1 - \frac{nj}{m} < p_s \frac{n}{m} + p_f \quad (\text{Eq. 2'})$$

In the following, we will refer to these two events as SUTV_F and SUTV_S for the Set Up Time violation for the signals forwarded by the Faster IP and Set Up Time violation for signals forwarded by the Slower IP, respectively.

The event which indicates the sampling of the request by the Slower IP or the sampling of the Ack signal when response data flow is considered occurs when:

$$\Delta t_i \leq T_{faster} \quad (\text{Eq. 3})$$

Eq. 3 becomes:

$$\left\lfloor \frac{mi}{n} \right\rfloor + 1 - \frac{mi}{n} \leq \frac{m}{n} \quad (\text{Eq. 3'})$$

Figure 5:
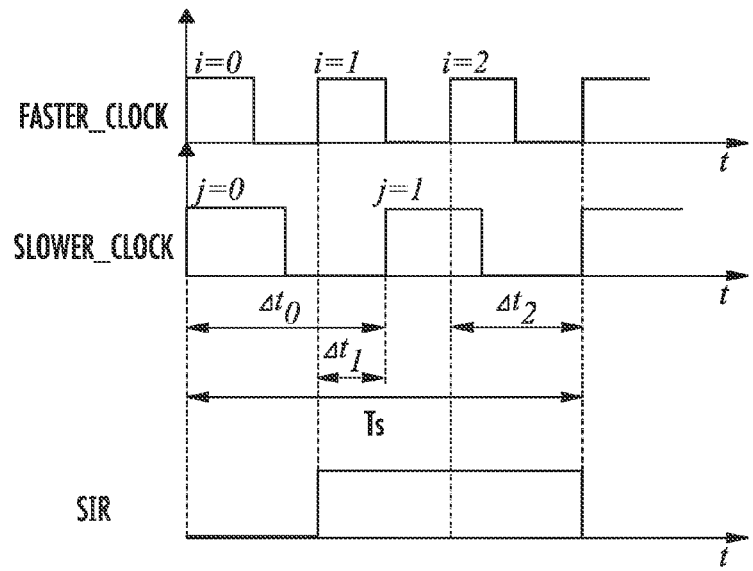
FIG. 5 shows, in a simplified and schematic representation, the timing sequence of the event SIR within the synchronization period $T_S$ according to the present invention.

In the following, we will refer to this event as Slower IP Ready to receive (SIR). As it can be noted in the last relationship, this event never occurs for i=0 and always for i=n−1 when m/n≦1. An example of an SIR event is shown in FIG. 5 for the frequency ratio 2/3, where the positive logic level indicates the sampling by the slower integrated processor or circuit.

Supposing that no transfer operation is pending if the faster integrated processor or circuit starts an action at time $t_i^{rf}$, that is, at cycle i ($0 \leq i < n$) within the synchronization period $T_S$, the action that the down conversion logic takes is:

1. If SIR='1' and SUTV_F='0' at cycle i, directly connecting the Faster IP to the Slower one, and vice versa: in this situation signals coming from the IPs must not be elaborated in any way (Req_f=Req_s='1' and Ack_f=Ack_s='1'). In this case the operation ends in the same cycle i.

2. If SIR='0' and SUVT_F='0' at cycle i, the Req_f signal needs to be forwarded to the Slower IP with no elaboration, while the bridge needs to filter the Ack_s signal, in the following cycles:

Req_s needs to maintain the logic level which Req_f had in the previous cycle;

Ack_s is to be forbidden until the cycle k (k>i) in which SIR='1' and Req_f[k+1]='1'; at the end of this cycle, the action started at time $t_i^{rf}$ completes;

3. If neither the case 1) nor the case 2) occur at cycle i, all the Slower and Faster IP signals needs to be filtered; all this, provided that we are not serving situation 2).

Now, let us suppose that the Slower IP starts an action at time $t_j^{rs}$ ($0 \leq j < m$) within $T_S$, and that no pending requests are present. Note that the time $t_j^{rs}$ ($0 \leq j < m$) is always inside a cycle i of the faster clock, but at the beginning of the synch period. The situations that may occur are:

1. SUTV_S='0' at the cycle i; in this case up conversion logic always forwards the request to the Faster IP and maintains it until the Faster IP samples it, that is until the end of the cycle; in the next cycles the signal is to be forbidden. This is the starting point of the operation. Req_f='0' otherwise.

2. If SUTV_S='0' at the cycle i, then starting from this cycle, the actions of the GFC are identical to what was explained for data exchange requested by the Faster IP.

Note that it is possible to complete an operation in the same cycle which it is requested in, only if the cycle is the last of the synchronization period, for example, only if Synch signal is at high logic level.

The above considerations outline the importance of knowing the state, cycle after cycle, of the three events (SUTV_F, SUTV_S and SIR) that are necessary to schedule a correct data transfer from a clock domain to another According to the present invention, control signal generators 4 and 5 are responsible to know the state, cycle after cycle, of the three events (SUTV_F, SUTV_S and SIR) that are necessary to schedule a correct data transfer from a clock domain to another.

By way of the Synch signal only, which is the unique signal requested to be generated by the clock generator subsystem, the two control signal generators 4 and 5 generate within the synchronization period $T_S$ the correct sequences of the three events and output them as three control signals that drive the operation of the frequency conversion logics of the GFC.

The control signal generators 4 and 5 are capable of generating the correct sequence for the three events according to the constraints imposed by the specific application, and they are also programmable by the design engineer to accommodate different frequency ratios or ratios changing on the fly.

When two different data buses are encountered, each of which with its own length and constraints, accordingly two schedulers could be necessary. One for driving the down conversion logic and another for the up conversion, as reported in FIG. 2.

Figure 6:
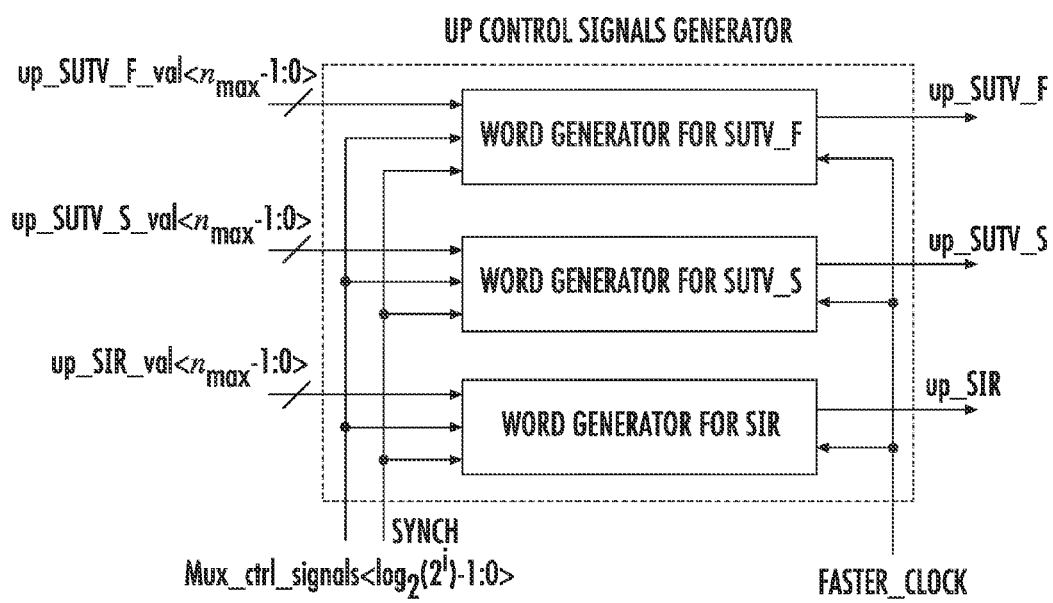
FIG. 6 shows a simplified and schematic representation of the up control signal generator scheme according to the present invention.

In fact, even if the two blocks use the same events it is possible to separate the implementation of the two buses and to match the requirements and constraints of a single frequency conversion block without conditioning the data transfer rate of the other one. Nevertheless, only one control signals generator (scheduler) may be used if the two buses have the same constraints The implementation of the only up control signal generator will now be described. More particularly, the control signal generator that produces the signals needed to correctly exchange data by way of the up frequency converter logic is composed of three word generators. A block scheme of the control signal generator and of its interface is shown in FIG. 6.

The up_EVENT_val signals are the preset signals and define the state of the particular event of interest for realizing the timing sequence in the $i^{th}$ cycle of the faster frequency clock within the synchronization period $T_S$.

The up_EVENT_val[i] signal defines the event state in the $i^{th}$ cycle of Faster_clock within the synchronization period $T_S$, and it is programmed according to the Set Up Time $T_{SU}$ of the system which has been fixed for the implementation. An external block, for instance one of the two integrated processors or circuits, provides these signals to the GFC and maintains them stable for the entire working time.

To implement a GFC that manages the set of frequency ratios m1/n1, m2/n2, ..., then the number $n_{max}$ is the maximum number among all the $n_i$ of the pre-defined set of frequency ratios.

The integer i is such that $2^i$ is the smallest integer power of 2 that contains $n_{max}$ ($2^{(i-1)} < n_{max} \leq 2^i$). If the current frequency ratio that has to be managed is $m_k/n_k$ then the current value of the mux_ctrl_signals must be set to $n_k-1$.

Word generators are realized by way of a few building blocks connected in cascade. To implement a GFC that manages the set of frequency ratios m1/n1, m2/n2, ..., the number of the building blocks for implementing a word generator is determined by $n_{max}$. All this is done for making the word generator flexible for managing different frequency ratios which may be dynamically changed during operation of the system.

Figure 7:
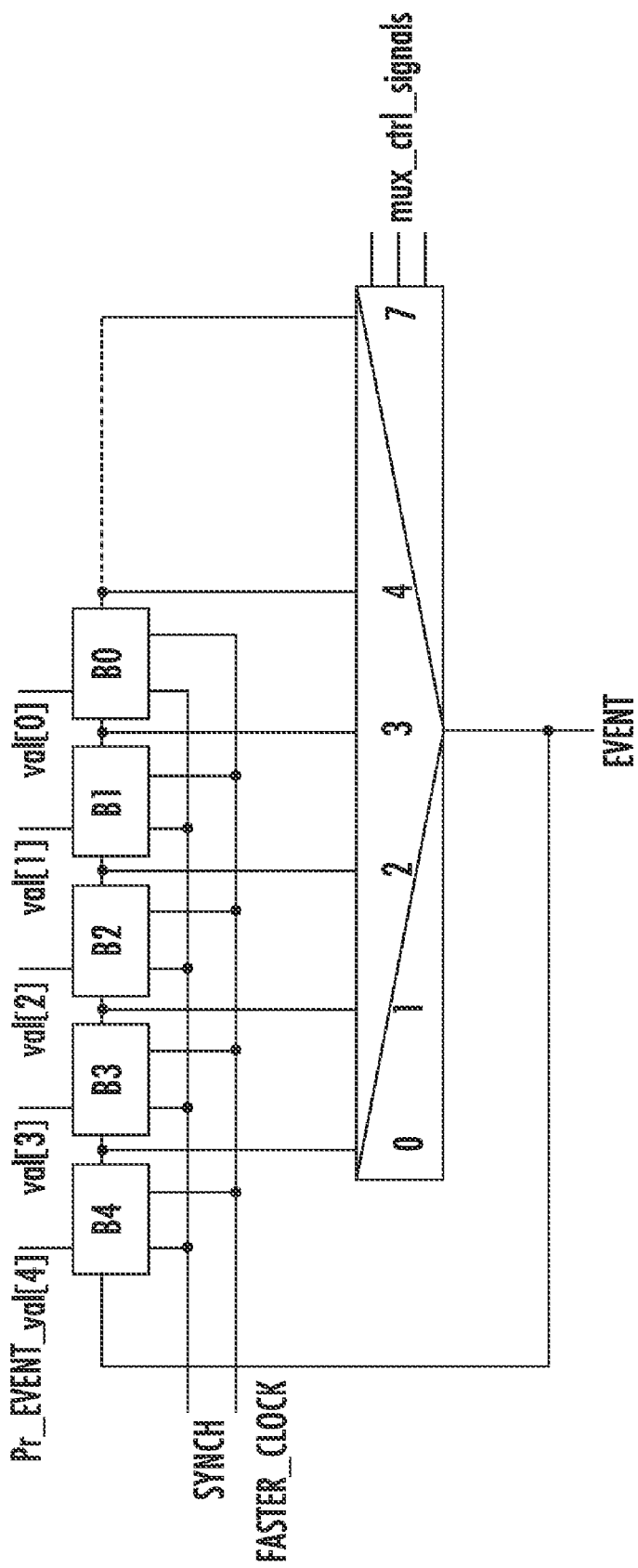
FIG. 7 shows, in a simplified and schematic representation, an example of a control signal generator according to the present invention.

In FIG. 7 an example of a word generator in the case $n_{max}=5$ (for handling frequency ratios equal to m/5 with $1 \leq m < 5$) is reported.

As it is schematically shown in FIG. 7, for each word generator, a multiplexer is implemented, which is needed to select the output of the flip-flop whose output represents the desired control signal. The feedback from the output of the multiplexer to the input of the Block 4 (Block $n_{max}-1$ in a general case) is useful if the synchronization or Synch signal is suddenly lost. It guarantees the correct operation of the generator.

The multiplexer dimensions (fan-in) is the smallest one that is capable of distinguishing among $n_{max}$ inputs, that is, the fan in the multiplexer is the smallest power of two that contains $n_{max}$. All the other inputs are, for convenience, connected to the output of the Block 0.

The control signals of the multiplexer (mux_ctrl_signals) are provided by the same integrated processor or circuit which the preset signals come from. They establish the output of the flip-flop that represents the control signal to be realized.

The control signals of the multiplexer determine the current frequency ratio that the GFC has to handle. As said above, if $m_k/n_k$ is the current frequency ratio of the pre-defined set of frequency ratios to be managed, then $n_k-1$ is the value to be set for the control signals of the multiplexer.

Figure 8:
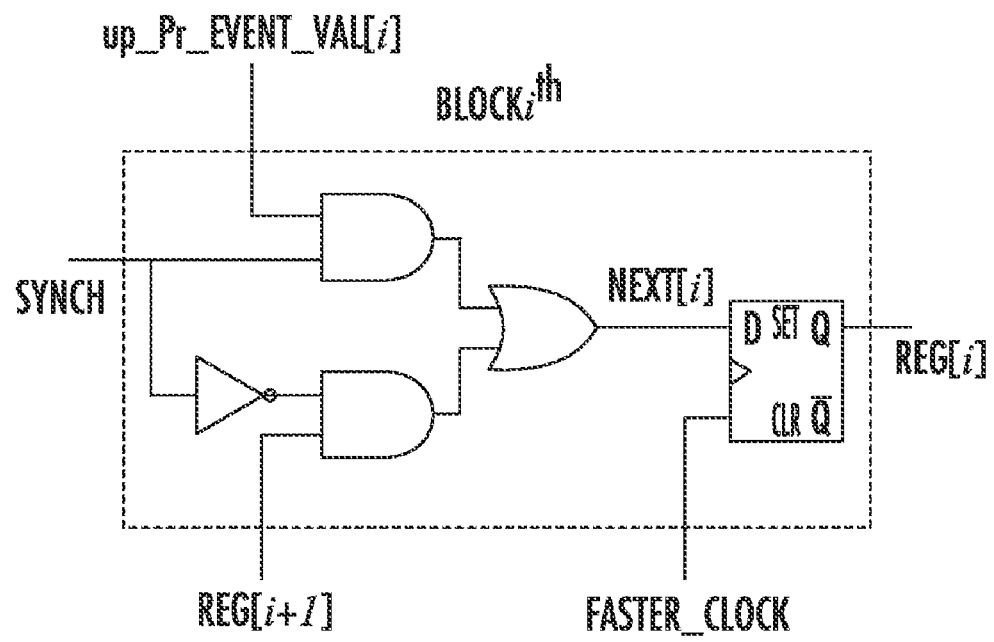
FIG. 8 shows a simplified and schematic representation of the $i^{th}$ building block of word generators according to the present invention.

In FIG. 8 the $i^{th}$ building block of the word generators is schematically represented. On every rising edge of the clock signal, the next[i] value is reported to the output reg[i] of the flip-flop. The current value of the next[i] signal is selected by the Synch signal. If the Synch signal is 0, then next[i] is equal to reg[i+1] signal, which is the output of the previous block of the word generator If the Synch is 1, then next[i] is equal to up_val[i], which is the preset signal that comes from a block external to the GFC.

Advantageously, the method addresses the problem of data synchronization between two integrated processors or circuits working with semi-synchronous clock signals, automatically exploring the design space and implementation parameters.

The present invention also relates to a definition and an implementation of a software platform capable of reducing as much as possible all practical issues in designing a generic synchronization device. In fact, the correct sequence within the synchronization period $T_S$ of events SUTV_F, SUTV_S and SIR, which depend on the specific frequency ratio under study and on the constraint given by the Set Up Time $T_{SU}$, is crucial for correct data transfer.

The values of these events are defined by EVENT_val signals that program the schedulers for the communication. For reliable transaction and for transaction with a given date transfer rate, only well defined values are allowed. These are a function of the Set Up Time of the system and of the constraints imposed by the application.

Moreover, when designing a complex integrated system, different options are possible in the placement and routing of different integrated processors or circuits, in such a way as to possibly obtain different values for $p_f$ and $p_s$. Therefore, it is of primary importance to study from a rather general point of view the dependence of the maximum transfer rate on $p_f$ and $p_s$.

More particularly, it is necessary to find within which limits $p_f$ and $p_s$ may be chosen in order to obtain a given transfer rate, provided certain constraints on the propagation delays result from floor-planning limitations.

In this case, it is necessary to know "a priori" what pairs of values $p_f$ and $p_s$, if any, may provide the desired transfer data rate, and vice-versa. More generally, it is necessary to implement a method that automatically allows the design engineer to configure the GFC for a specific application under study.

Advantageously, the method provides for design space exploration, for example, relating to design constraints (frequency ratio, faster clock, etc.) and to planning scheduling (EVENT_val's) and synthesis parameters. Moreover, these methods interface to the synthesis system in such a way to reduce as much as possible front-end design time.

Figure 9:
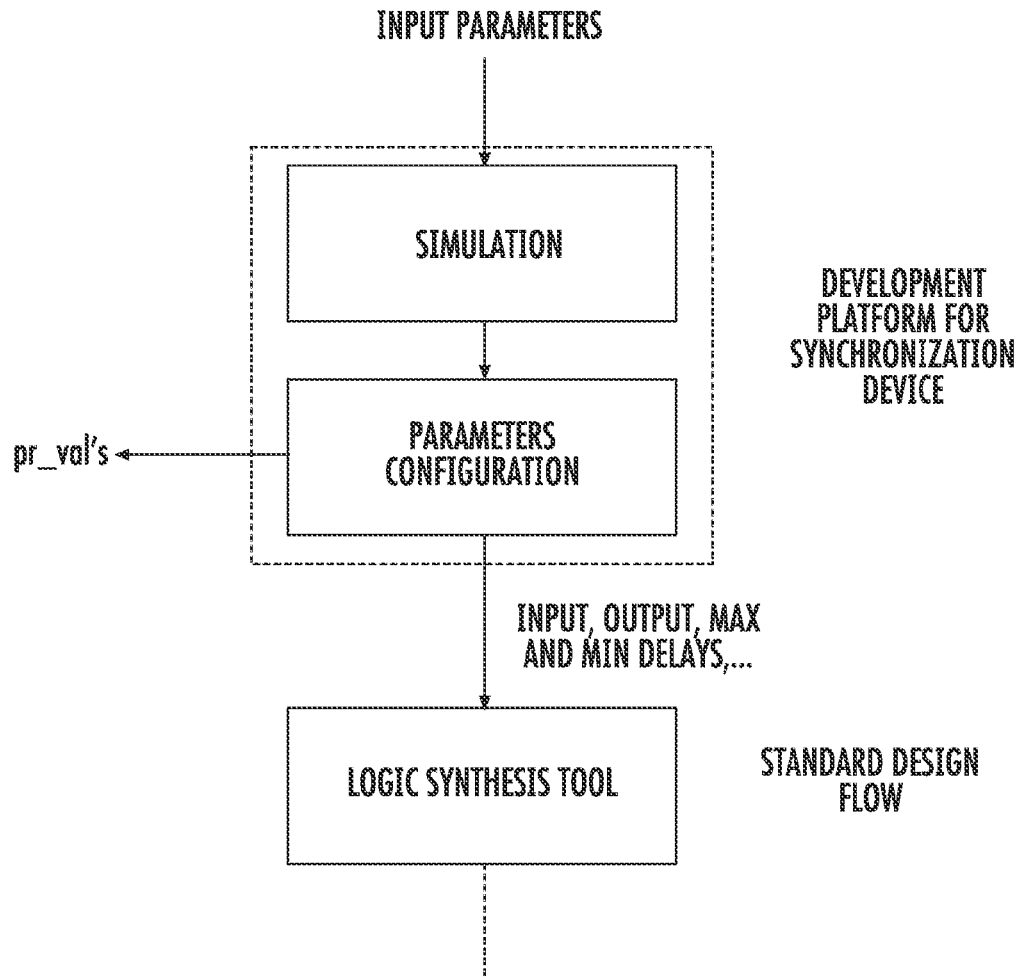
FIG. 9 shows a flow chart of the design environment of the method according to the present invention.

Advantageously, the method is capable of providing with a high degree of confidence information on the possibility of synthesizing the device when design constraints and output parameters are given. The flow chart of the design platform operations and its interface to the synthesis tool is depicted in FIG. 9.

The input parameters of the development platform are: the frequencies ratio (m, n), the Faster_clock ($f_{faster}$), the maximum clocks skew (clks_skew), the GFC critical path (bridge_delay) and the resolution step (resolution), whose meaning will be made clear later on. The output parameters are the values for correctly programming the schedulers (EVENT_val's) and a script file which is imported into the synthesis tool.

The method comprises three logical steps: simulation, output of the EVENT_val's and generation of a script file to be imported in a synthesis tool.

The Set Up Time of the system $T_{SU}$ has been defined for convenience as the sum of two parts which are expressed for convenience as multiplies of clock periods. Two parameters ($p_f$ and $p_s$) establish the weight that each part has in determining the Set Up Time $T_{SU}$, which is the overall delay needed to safely communicate a signal generated by one integrated processor or circuit to the other one.

More particularly, this time includes different delays, which are:
the time after which the signals generated by an integrated processor or circuit may be considered stable at its interface (clock-to-out);
the wires bus delay;
the GFC propagation delay; and
the Set Up Time imposed by the receiver interface.

Hence, the time $p_f T_f$ is assumed to be composed of the propagation delay from a faster IP interface to a GFC interface, the faster IP clock-to-out delay (or faster IP Set Up Time if the acknowledgement signal is considered) and the critical path delay of the GFC. It is worth noting that this last delay is a constant for a given implementation technology.

Therefore, the time $p_f T_f$ may be considered as the sum of two parts, one of which is a constant. In order to take into consideration this fact, let us put:

$$p_f = \text{del}_f + C$$

where C is a constant which depends on the process to be used for implementation, and $\text{del}_f$ is the fraction of $T_f$ which takes into account the delay from Faster IP interface to GFC interface and the faster IP clock-to-out delay (or Faster IP Set Up Time if the acknowledgement signal is considered). Hereafter, the sum of these two last delays will be referred to as an input (or an output) delay for signals that are in the faster domain.

In the same way, the timing component $p_s T_s$ can be considered as comprising the bus propagation delay in a slower domain and the Slower IP Set Up Time (or clock-to-out, if we consider the request signal). Accordingly, let us put:

$$p_f = \text{del}_f$$

where $\text{del}_s$ is the sum of these two delays, and it will be indicated as an input (or an output) delay for signals in the slower clock domain.

In summary, the parameters $\text{del}_f$ and $\text{del}_s$ provide the user with the maximum possible values of input and output delays of the bus control signals that can be tolerated when implementing the synchronization device. The parameters $\text{del}_f$ and $\text{del}_s$ have an important role in the synthesis process, and therefore, they are correctly estimated to support the design engineer for developing projects employing the GFC.

Setting the input parameters in a simulator, it is possible to estimate with a high level of confidence the maximum input and output delays which may be set to the GFC input and output signals in all the possible situations in the synthesis process.

Because Eqs. 1', 2' and 3' have been obtained by taking into account the two clock signals as if they were ideal and an elaboration time of GFC that was negligible, for a practical evaluation of $\text{del}_f$ and $\text{del}_s$ the clocks skew and the GFC delay are to be considered. The effect of real clocks and GFC delay may be considered as a loss in $\Delta t_i$ and $\Delta t_j$ with respect to an ideal case.

More particularly, the losses due to the GFC propagation delay and clock uncertainties are strictly dependent on the maximum frequency, and they have been modeled by an empirical rule which linearly depends on the maximum frequency; the losses which are encountered for data flow generated by the integrated processor or circuit in the faster clock domain path may be modeled as:

$$(\text{clks\_skew} + \text{bridge\_delay}) \cdot f_{faster} \quad \text{(Eq 4)}$$

while the losses in the slower clock domain are:

$$\text{clks\_skew} \cdot f_{faster} \cdot \frac{m}{n} \quad \text{(Eq. 5)}$$

Figure 10:
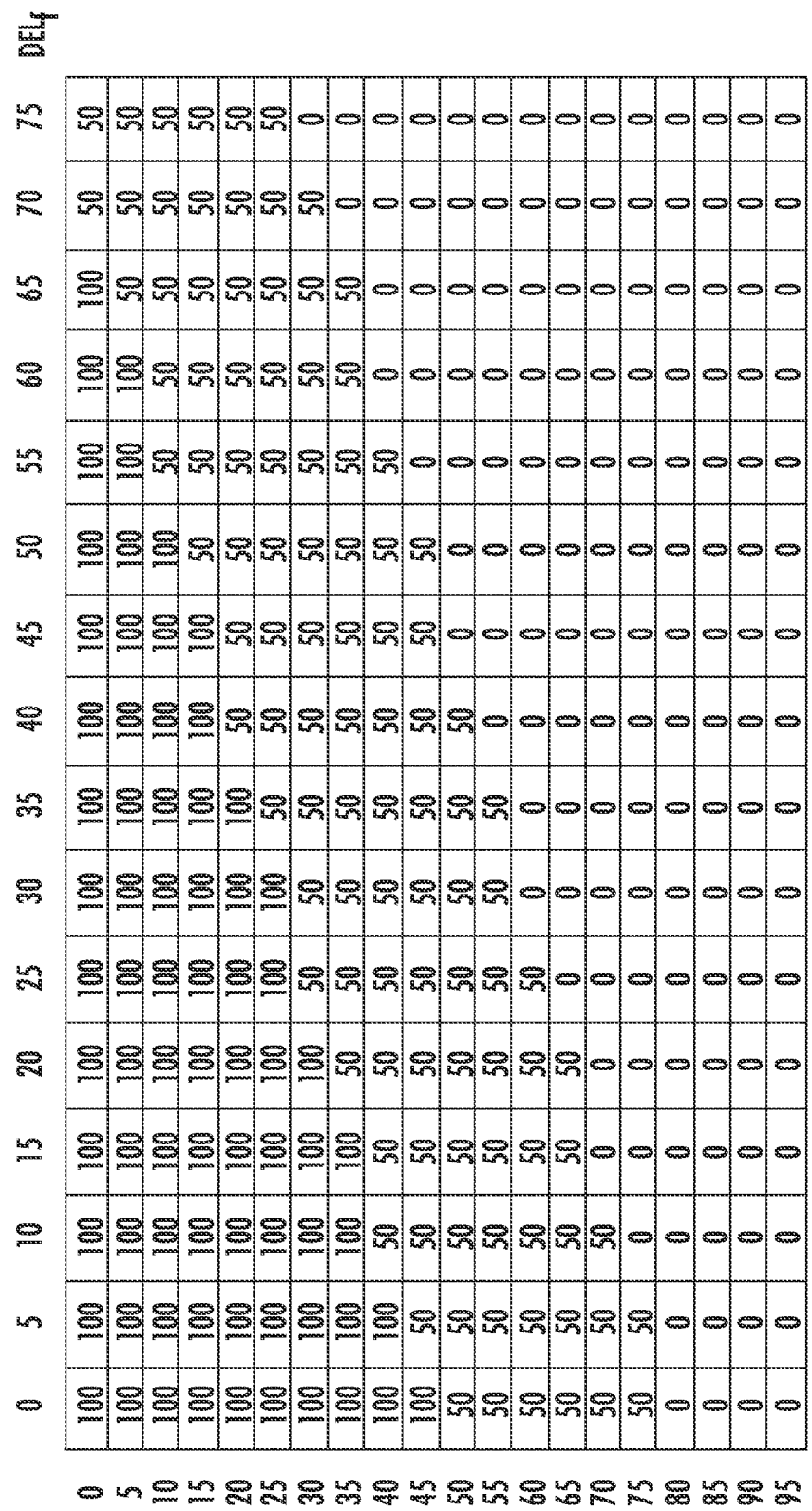
FIG. 10 shows a table representing the data transfer rates generated by a faster clock according to the present invention.
Figure 11:
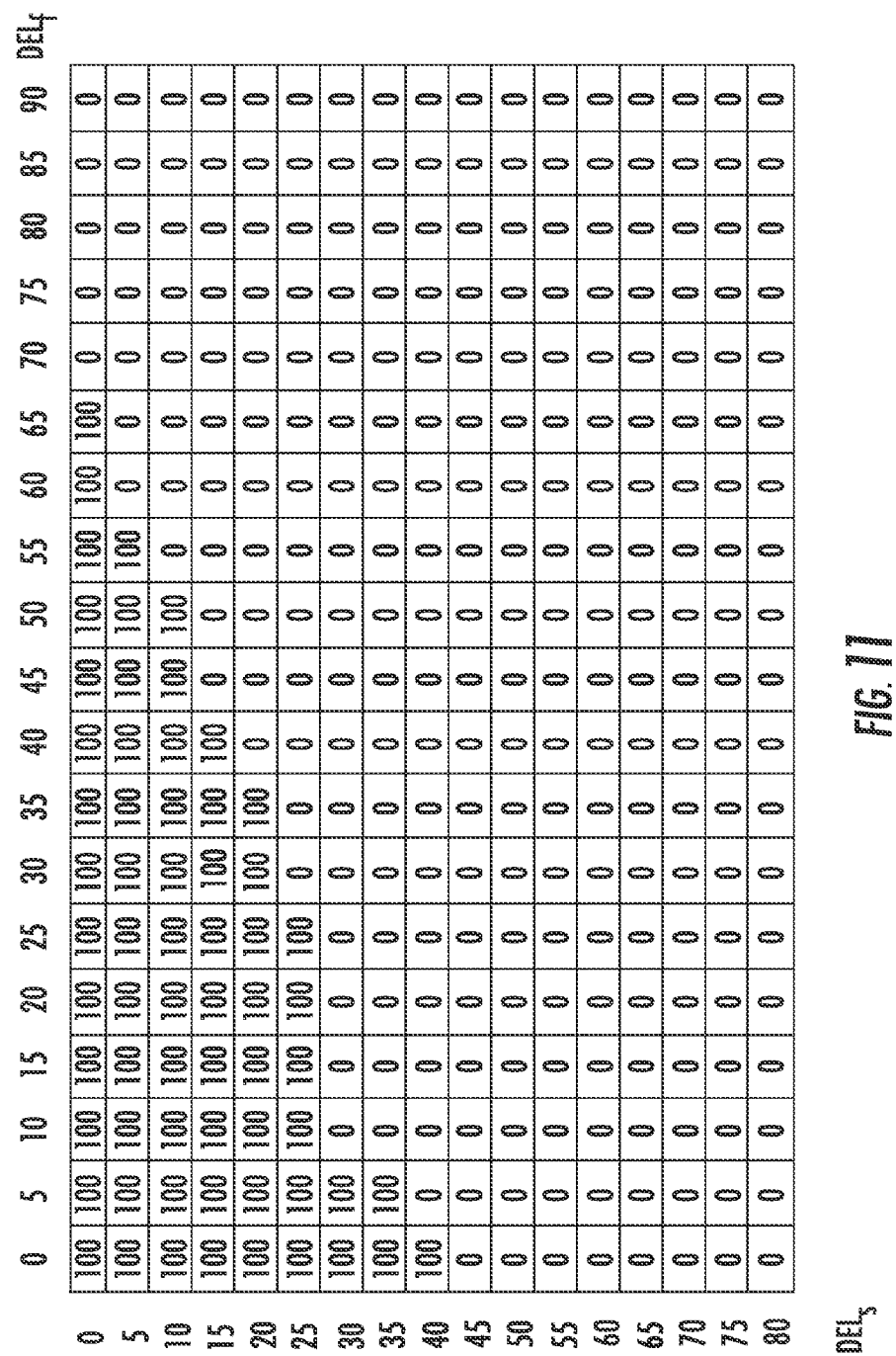
FIG. 11 shows a table representing the data transfer rates generated by a slower clock according to the present invention.

The result of the simulators, schematically represented in FIGS. 10 and 11, provide the values of the transfer rate, expressed as a fraction of the slower clock frequency, as a function of the maximum possible values of the input and output delays ($\text{del}_f$ and $\text{del}_s$) of the signals of the GFC which may be tolerated Moreover, the simulators output other useful information which may facilitate the configuration of the synthesis parameters, and indicate with a high degree of confidence the possibility of synthesizing the block.

Tables in FIGS. 10 and 11 represent a result obtained through an embodiment in the case of a frequency ratio with m=2 and n=3, with the hypothesis that the maximum frequency involved is 300 MHz, the clocks skew is 0.22 ns and the elaboration time of the GFC is 0.6 ns. More particularly, the resolution step chosen for $\text{del}_f$ and $\text{del}_s$ is 5% of $T_f$ and $T_s$.

As it may be seen in FIG. 10, related to the data flow generated by the Faster integrated processor or circuit, on the first horizontal line the maximum possible values of input and output delays $\text{del}_f$ of the signals related to the faster clock domain (Req_f and Ack_f) are reported.

In the same way, on the vertical axis, in the first column, there are reported the maximum possible values of the input and output delays $del_s$ of the signals related to the slower clock domain (Req_s and Ack_s). For all pairs of the parameters $del_f$ and $del_s$ the theoretical values of the maximum transfer data rate, which are expressed as a percentage of the slower clock frequency involved, are shown.

Advantageously, the method allows a design engineer to know "a priori" the value of the transfer data rate related to the input and output delays that may be guaranteed in the particular context of study Vice-versa, if the requirements are much more directed to the certainty of a particular value of transfer rate, by way of the table in the figures, the design engineer is able to directly read the input and output delays values which have to be respected for achieving this goal.

The table in FIG. 11 is related to the data flow generated by the Slower integrated processor or circuit, and has been obtained by applying for the losses the following equations:

$$(\text{clock\_skew} + \text{bridge\_delay}) \cdot f_{faster} \cdot \frac{m}{n} \quad \text{(Eq. 6)}$$

$$\text{clock\_skew} \cdot f_{faster} \quad \text{(Eq. 7)}$$

Equation 6 is applied to the slower domain and Equation 7 to the faster one. The inspection of the table in FIG. 11 is analogous to that of the table in FIG. 10. In this case the design engineer has to start its choice by first selecting the input and output delays of the signal related to the slower clock domain in the column of the table, and then follows the same procedure explained above to select the input and output delays of the signals related to the faster clock domain to obtain the desired transfer rate.

The proposed simulators provide for the user to set the constraints $del_f$ and $del_s$ which allow one to obtain the desired transfer rate. When these constraints have been defined, it is necessary to generate the values for the events SUTV_F, SUTV_S and SIR within $T_S$ which insure the correct scheduling operations in the case under study with the given assumptions Advantageously, after defining the two parameters $del_f$ and $del_s$, either for the down converter or for the up converter, according to the constraints and requirements of the particular scenario of study, all that we need to program the EVENT_val [i] values for each control signals is obtained.

In fact, the design engineer only set as input parameters the constraints that have been selected from the tables described above ($del_s$ and $del_f$, either for the down converter or for the up converter), and the method allows output of these values in further tables.

The table in FIG. 12 reports for simplicity the results of the elaboration of the tool for the up converter logic in the case m=2, n=3 with the assumptions resolution=5%, $f_{faster}$=300 MHz, clks_skew=0.2 ns, bridge_delay=0.6 ns, $del_f$=25% and $del_s$=25%.

The method also comprises an interface for generating a script file to be imported in a traditional synthesis tool. A script generator outputs a text file and alerts for any constraints configuration which is not compatible to correct data transfers and the metastability issues. Part of a script file generated in a case under test is schematically reported in FIG. 13.

Figure 14:
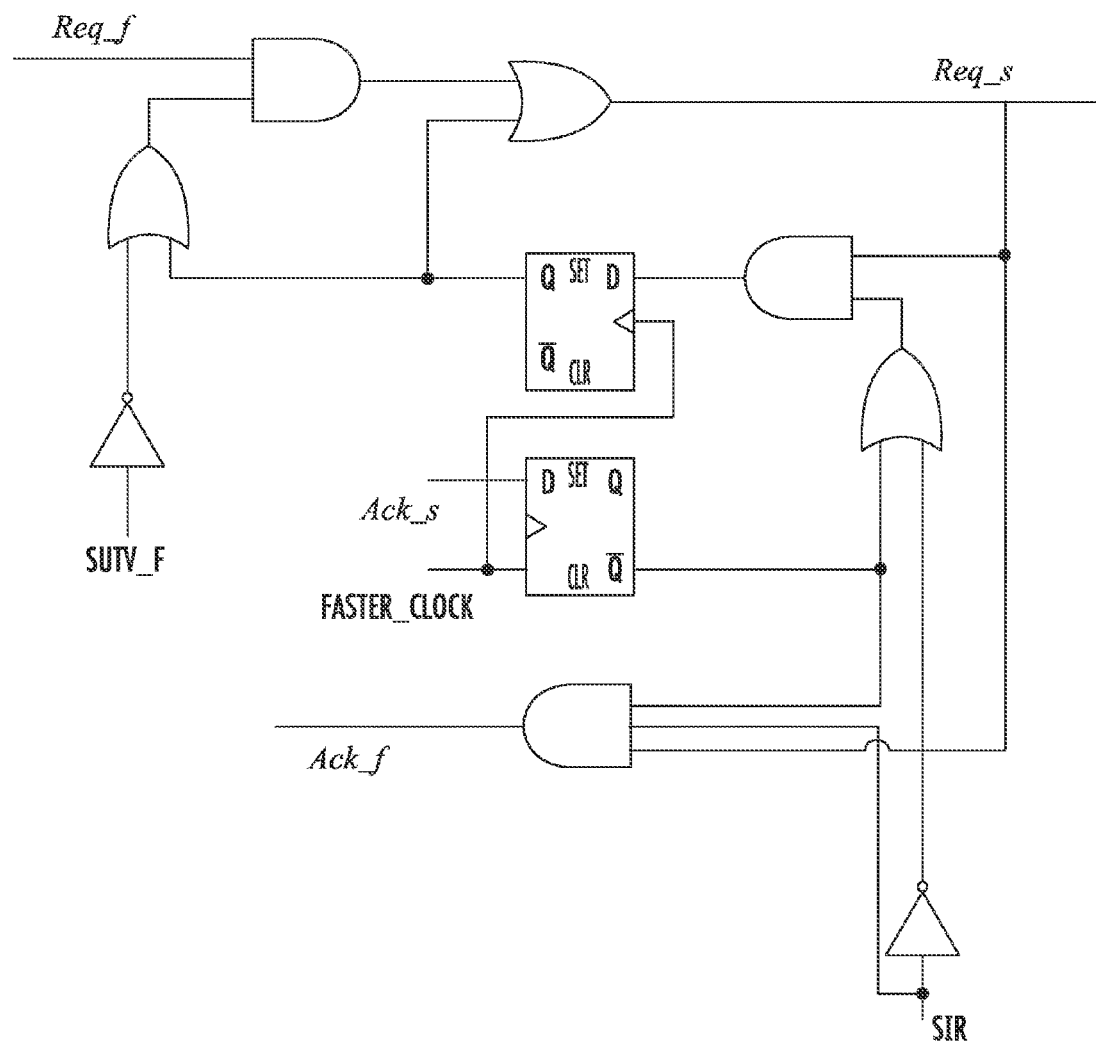
FIG. 14 shows, in a simplified and schematic representation, the down frequency converter according to the present invention.
Figure 15:
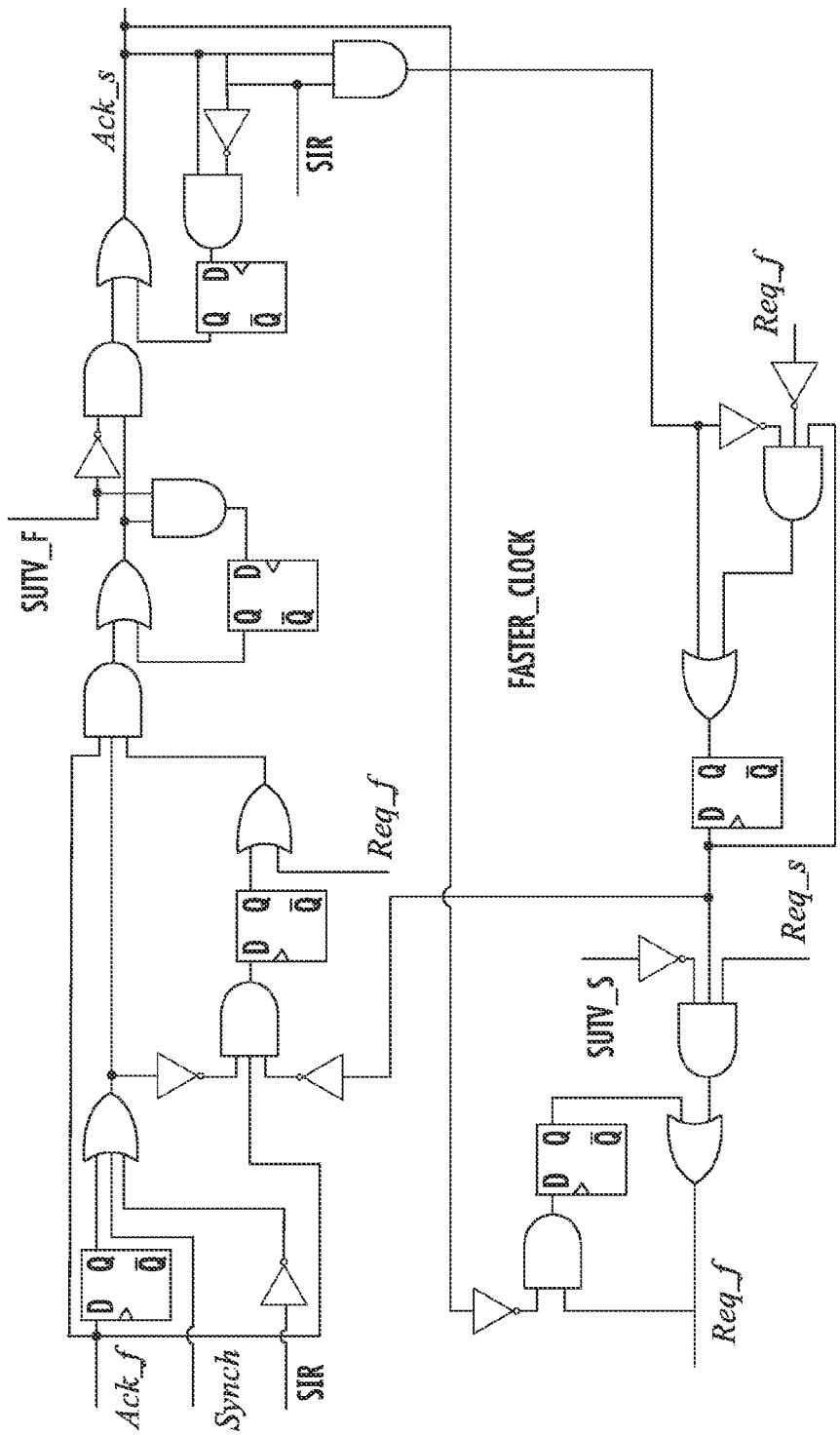
FIG. 15 shows, in a simplified and schematic representation, the up frequency converter according to the present invention.

FIGS. 14 and 15 show the down frequency conversion logic and the up frequency conversion block scheme.

The advantages achieved through the method are multiple. Data transfer in semi-synchronous clock domains circuit are flexible, general and systematic; acting only on a communication control signals (Request and Grant) and without the use of data buffers, overcoming traditional synchronization issues due to dual port RAM or dual port based method; setting and feasibly changing a few critical parameters, constraints and some other parameters of the technological process that are used for implementing the device; and alerting a design engineer about the actual possibility to synthesize devices or integrated circuits on the basis of particular project parameters, that is, the very same parameters set by the design engineer during the simulation phase.

In this way a design engineer not only may foresee the performance but also verify the feasibility of the synthesization phase. Even if the method is based on a deterministic approach, while the rule for establishing the synthesizability is a statistic one in standard synthesis tools, the method ensures a good level of accuracy.

In fact, knowing "a priori" the possibility to synthesize, under a particular parameters selection and relatively to a given context, is particularly relevant when a System On Chip comprises a plurality of devices, the synthesization being carried out automatically and without further analysis on the context. The method improves the time and cost needed to synthesize the entire System On Chip.

Advantageously, this method overcomes the limits of the classical theories using an approach that maintains the general nature of the methodology that uses a dual port RAM but eliminating the high impact in area and latency of which this standard technique soffers.

Advantageously, the method does not introduce latencies and high area consumption compared to other methods dealing with data synchronization according to a philosophy that addresses a specific frequency ratio in a specific and well defined scenario.

Moreover, it addresses the problem of synchronization for all frequency ratios in all the possible scenarios, giving to the design engineer the possibility of setting the most critical parameters for the synthesis and verifying all the possible maximum data rate as a function of the input and output delays of the control signals of the synchronous bus protocol.

The present invention also relates to a system for data transfer between two semi-synchronous clock domains in a System on Chip. The system includes at least corresponding first and second integrated processors or circuits respectively operating at a first and a second frequency clock.

More particularly, the system comprises detection means or a detector for detecting, at each frequency ratio between the first and second frequency clock, a maximum rate of the data transfer The data rate is a function of all the possible input and output delays supported by the System on Chip, depending on a plurality of technological parameters.

More particularly, the system also comprises a scheduler for driving the data transfer between the semi-synchronous clock domains and a generic frequency converter between the first and the second integrated processors or circuits for the data transfer. Advantageously, the system improves data transfer in semi-synchronous clock domains including at least two integrated processors or circuits of a System on Chip based on a synchronous interconnection protocol.

In fact, the system provides "a priori" a maximum possible data rate for a specific ratio m/n in order to exchange only the supported data for that specific ratio, programs correctly a scheduler that drives transfer operation and then provides a generic frequency converter between the integrated processors or circuits for data exchange, for each frequency ratio m/n according to the results of the previous phases.

That which is claimed is:

1. A method for transferring data between two semi-synchronous clock domains in a System on Chip comprising at least first and second integrated circuits, respectively operating at first and second clock frequencies, the method comprising:
   detecting, for each frequency ratio between the first and second clock frequencies, a desired rate of data transfer;
   programming a frequency conversion between the first and second integrated circuits for the data transfer at the desired rate, the programming comprising
      generating within a synchronization period sequences of events,
      converting the sequences of events to corresponding control signals, and
      driving the frequency conversion according to the corresponding control signals, the control signals being used to generate at least one word through a plurality of building blocks connected in cascade, with at least a portion of the plurality of building blocks operating at a frequency between the first and second clock frequencies; and
   scheduling the data transfer at the desired rate between the first and second integrated circuits.

2. A method according to claim 1 wherein the data transfer at the desired rate corresponds to a maximum rate.

3. A method according to claim 1 wherein the first and second integrated circuits comprise first and second processors.

4. A method according to claim 1 wherein the desired rate is a function of the possible input and output delays supported by the System on Chip.

5. A method according to claim 4 wherein the possible input and output delays take into account a plurality of technological parameters associated with the System on Chip.

6. A method according to claim 1 further comprising alerting a user about synchronization of the System on Chip based upon an output therefrom.

7. A method according to claim 1 wherein the sequences of events and the control signals are sequences of three events and three control signals.

8. A data transfer system between two semi-synchronous clock domains in a System on Chip comprising at least first and second integrated circuits respectively operating at first and second clock frequencies, the data transfer system comprising:
   a detector for detecting, at each frequency ratio between the first and second clock frequencies, a desired rate of data transfer;
   a scheduler for driving the data transfer at the desired rate between the semi-synchronous clock domains; and a frequency converter between the first and second integrated circuits for the data transfer at the desired rate, based on the following
      generating within a synchronization period sequences of events,
      converting the sequences of events to corresponding control signals, and
      driving the frequency conversion according to the corresponding control signals, the control signals being used to generate at least one word through a plurality of building blocks connected in cascade, with at least a portion of the plurality of building blocks operating at a frequency between the first and second clock frequencies.

9. A data transfer system according to claim 8 wherein the data transfer at the desired rate corresponds to a maximum rate.

10. A data transfer system according to claim 8 wherein the first and second integrated circuits comprise first and second processors.

11. A data transfer system according to claim 8 wherein the desired rate is a function of the possible input and output delays supported by the System on Chip.

12. A data transfer system according to claim 11 wherein the possible input and output delays take into account a plurality of technological parameters associated with the System on Chip.

13. A data transfer system according to claim 8 wherein the System on Chip generates an output for alerting a user about synchronization of the first and second integrated circuits.

14. A data transfer system according to claim 8 wherein the sequences of events and the control signals are sequences of three events and three control signals.

15. A System on Chip comprising:
   at least first and second integrated circuits defining two semi-synchronous clock domains respectively operating at first and second clock frequencies; and
   a data transfer system between said first and second integrated circuits and comprising
      a detector for detecting, at each frequency ratio between the first and second clock frequencies, a desired rate of data transfer,
      a scheduler for driving the data transfer at the desired rate between the semi-synchronous clock domains, and
      a frequency converter for the data transfer at the desired rate and operating based on the following
         generating within a synchronization period sequences of events,
         converting the sequences of events to corresponding control signals, and
         driving the frequency conversion according to the corresponding control signals, the control signals being used to generate at least one word through a plurality of building blocks connected in cascade, with at least a portion of the plurality of building blocks operating at a frequency between the first and second clock frequencies.

16. A System on Chip according to claim 15 wherein the data transfer at the desired rate corresponds to a maximum rate.

17. A System on Chip according to claim 15 wherein the first and second integrated circuits comprise first and second processors.

18. A System on Chip according to claim 15 wherein the desired rate is a function of the possible input and output delays supported by the System on Chip.

19. A System on Chip according to claim 18 wherein the possible input and output delays take into account a plurality of technological parameters associated with the System on Chip.

20. A System on Chip according to claim 15 wherein the System on Chip generates an output for alerting a user about synchronization of said first and second integrated circuits.

21. A System on Chip according to claim 15 wherein the sequences of events and the control signals are sequences of three events and three control signals.

* * * * *

UNITED STATES PATENT AND TRADEMARK OFFICE
CERTIFICATE OF CORRECTION

PATENT NO. : 7,676,685 B2  Page 1 of 1
APPLICATION NO. : 11/421306
DATED : March 9, 2010
INVENTOR(S) : Castano et al.

It is certified that error appears in the above-identified patent and that said Letters Patent is hereby corrected as shown below:

| | |
|---|---|
| Column 2, Line 21 | Insert: --a-- |
| Column 4, Line 6 | Delete: "processor" Insert: --processors-- |
| Column 4, Line 7 | Delete: "is" Insert: --in-- |
| Column 7, Line 37 | Delete: "signals" Insert: --signal-- |
| Column 8, Line 39 | Insert: --.-- |
| Column 9, Line 35 | Delete: "multiplies" Insert: --multiples-- |
| Column 10, Line 58 | Delete: "clocks" Insert: --clock's-- |
| Column 11, Line 43 | Insert: --,-- |
| Column 11, Line 44 | Delete: "signals" Insert: --signal,-- |
| Column 11, Line 66 | Delete: "a" |
| Column 12, Line 17 | Delete: "parameters" Insert: --parameter-- |
| Column 12, Line 28 | Delete: "soffers" Insert: --offers-- |

Signed and Sealed this

Seventeenth Day of August, 2010

David J. Kappos
*Director of the United States Patent and Trademark Office*